INVENTOR.
DEAN E. RUNKLE
BY
William N. Antonis
ATTORNEY

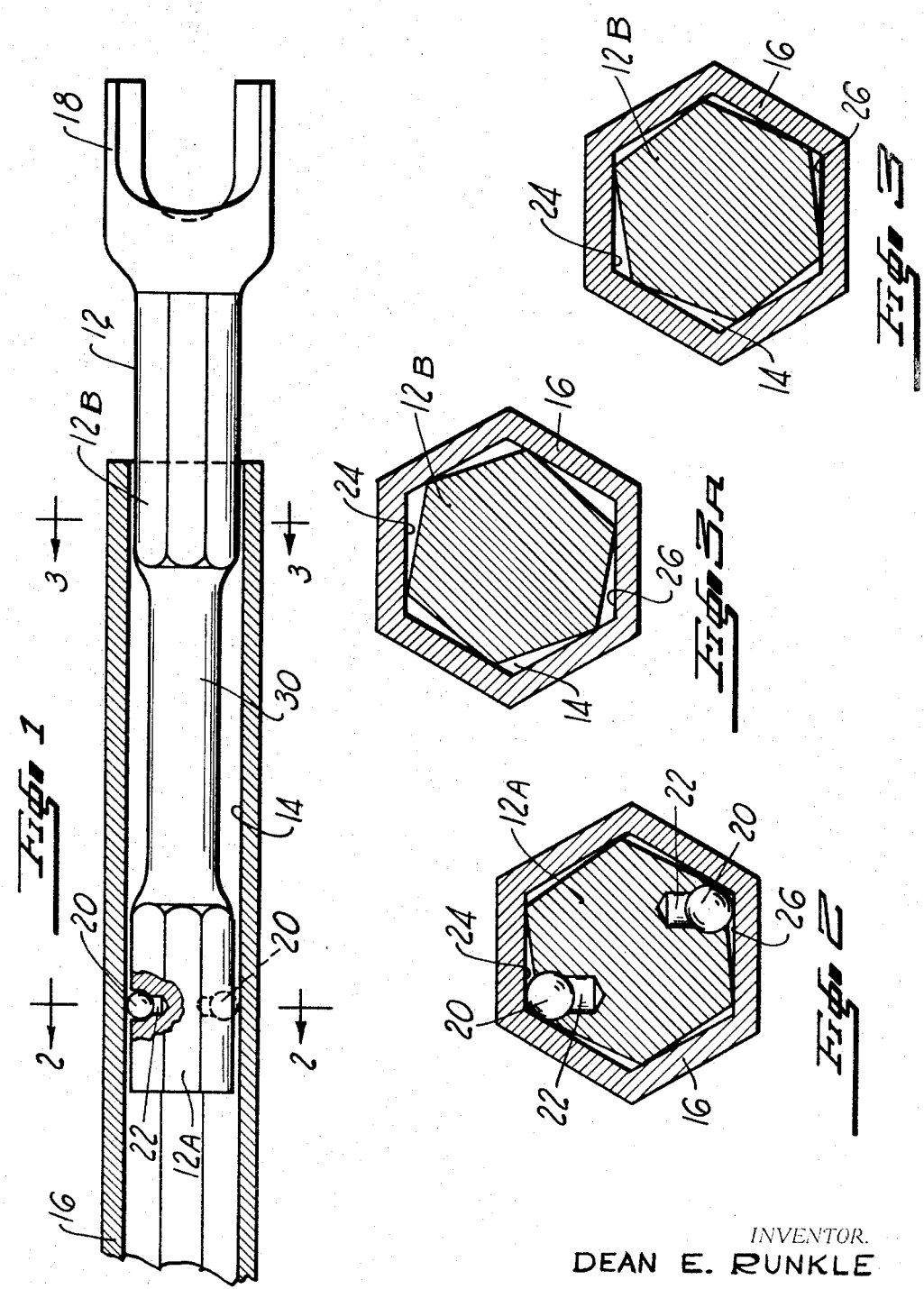

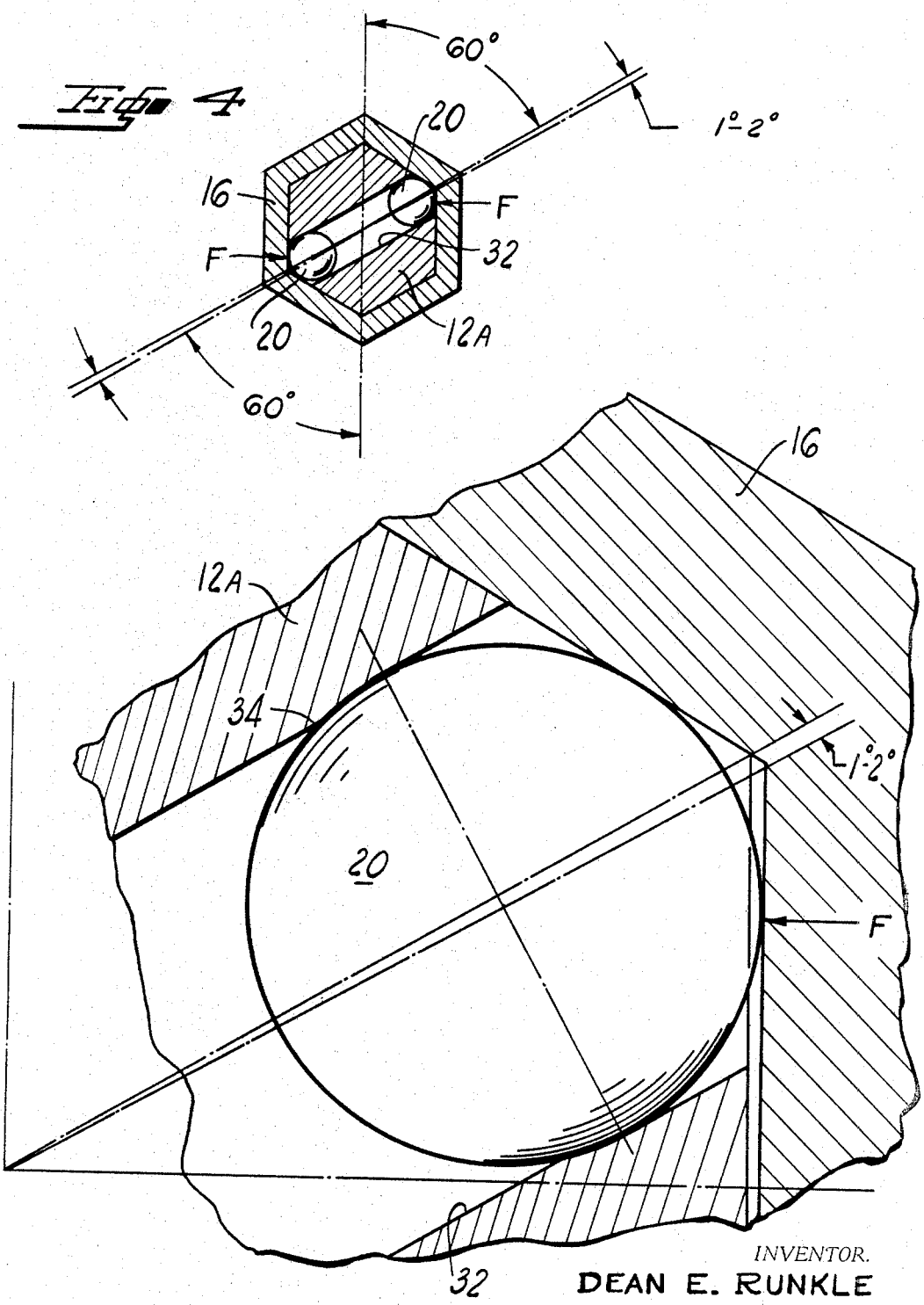

INVENTOR.
DEAN E. RUNKLE
BY
William N. Antonis
ATTORNEY

United States Patent Office
3,434,369
Patented Mar. 25, 1969

3,434,369
NO-LASH AXIALLY MOVABLE STEERING COLUMN
Dean E. Runkle, South Bend, Ind., assignor to The Bendix Corporation, a corporation of Delaware
Filed Sept. 20, 1967, Ser. No. 669,050
Int. Cl. B62d *1/18*
U.S. Cl. 74—493     23 Claims

ABSTRACT OF THE DISCLOSURE

The following relates to a steering column arrangement having two telescoping shafts, the first of which has a polygonal shape and the second of which has a corresponding polygonal bore for receiving the first shaft. Force transmitting abutments which protrude from one of the shafts engage the adjacent polygonal surface of the other shaft at off-center locations to cause relative rotation and frictional engagement between the two shafts, thereby taking up rotational play and preventing subsequent uncontrolled relative rotation between the shafts. In order to limit overload forces from being exerted against the abutments and rendering them subsequently ineffective, one of the shafts is formed with a rotationally flexible section which is located between the abutments and a fail-safe portion formed on the shaft, wherein the fail-safe portion provides engagement between opposite ends of the mating shaft sides at torque levels above a predetermined value which cause flexure of the rotationally flexible section and reverse relative rotation between the shafts at the fail-safe location.

Background of the invention

In my earlier issued U.S. Patent No. 3,318,170, which also related to a lash-free axially movable steering column for use on a driver-operated motor vehicle, the torsional lash was eliminated from two polygonal telescoping shafts of the steering column by utilizing a plurality of spring-loaded members located in one of the shafts which abutted different polygonal surfaces of the other shaft at a location off center of the abutting polygonal surface to cause rotation and continuous frictional engagement of one of the shafts with respect to the other of the shafts to thereby eliminate torsional lash therebetween. In some of the simpler and less expensive embodiments the spring load was provided by utilizing a coil spring, a rubber block, or other elastomer, in a blind bore behind a ball or cylindrical roller. In such installations, it oftentimes was difficult to achieve the desired spring preload because the tolerance stack of the inner shaft, the bore of the outer shaft, and the drill depth could vary, and as a consequence could affect the torsional deflection between and force required to collapse the telescoping shafts.

Summary of the invention

Accordingly, in view of the foregoing, it is an object of this invention to provide a collapsible steering column having inner and outer telescoping shafts wherein the foregoing tolerance stack problem of the inner shaft, the bore of the outer shaft, and drill depth is eliminated.

Another object of this invention is to provide a lash-free telescoping steering column which will collapse when it is subject to a predetermined load.

A further object of this invention is to provide force transmitting abutments which protrude from the inner or outer shafts and engage the other of said shafts for causing relative rotation and frictional engagement between the shafts to thereby eliminate torsional lash therebetween, wherein the abutments do not utilize a separate resilient member therebehind to provide the desired preload.

A still further object of this invention is to provide a collapsible steering column of the type described wherein overload forces, which would render the protruding abutments subsequently ineffective, are prevented from being exerted thereagainst by forming one of the shafts with a rotationaly flexible section, said flexible section being located between the abutments and a fail-safe portion formed on the shafts. The fail-safe portion provides engagement between opposite ends of the mating shaft sides for carrying heavy torsional loads at torque levels above a predetermined value which cause flexure of the rotationally flexible section and reverse relative rotation between the shafts at the fail-safe location.

Another object of this invention is to provide a collapsible steering shaft which has maximum torsional rigidity in both directions of rotation.

A further object of this invention is to provide a collapsible steering shaft wherein the preset collapsible force can be held as low as possible.

A still further object of this invention is to provide a no-lash steering column with a fail-safe mechanism which does not become operative until after a predetermined torque level is reached.

The above and other objects and features of this invention will become apparent from the following description taken in connection with the accompanying drawings.

Brief description of the drawings

FIGURE 1 is a sectional view of a portion of a steering column of a vehicle showing the axially movable components thereof and the invention relating thereto;

FIGURE 2 is an exaggerated sectional view taken along line 2—2 of FIGURE 1;

FIGURE 3 is an exaggerated view taken along line 3—3 of FIGURE 1;

FIGURE 3A is a sectional view taken along line 3—3 of FIGURE 1 after rotation of the inner shaft in a clockwise direction exceeds a predetermined torque level;

FIGURE 4 is a sectional view similar to that of FIGURE 2 showing both of the protruding balls in a single through bore;

FIGURE 5 is an enlarged sectional view of a portion of FIGURE 4 showing the resulting geometric relationship between the telescoped shafts;

Description of the preferred embodiments

Figure 7:
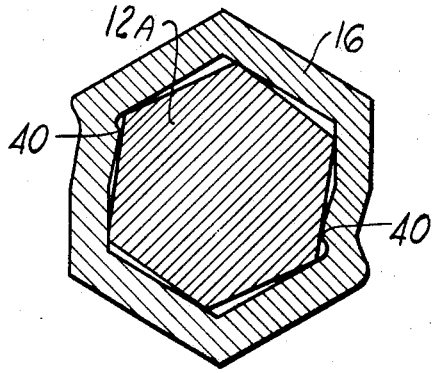
FIGURE 7 is an exaggerated sectional view taken along line 7—7 of FIGURE 6.

Referring to FIGURES 1-3, it will be seen that an axially movable shaft 12 having a hexagonal shape is located in a corresponding hexagonal bore 14 formed in an axially fixed shaft 16. Shaft 12 is suitably connected to the steering wheel (not shown) of a vehicle through means of a universal joint 18, only a portion of which is shown, whereas shaft 16 is suitably connected to the steering gear (not shown) of the vehicle. By telescoping shaft 12 within shaft 16 it will be apparent that axial adjustment of the vehicle steering wheel can be accomplished simply by pushing or pulling on the steering wheel. Furthermore, with a collapsible steering column of this type, in the event of an accident, injury to the driver will be minimized because the steering column can telescope upon impact.

Since it is impractical from a tolerance standpoint to make the telescoping shafts 12 and 16 lash free, that is, free of non-controlled torsional lost motion, a ball 20 is press fit into each of two blind bores 22 to cause relative rotation and frictional engagement between the two shafts. The balls are arranged so that they abut opposed hexagonal surfaces 24 and 26 of shaft 16 at points off center of each hexagonal surface so as to create a couple, that is, a pair of equal parallel forces acting in opposite directions tending to produce rotation.

By pressing the ball 20 into an interference bore 22 so that it protrudes from the surface of the hexagonal shaft 12, the ball will be held firmly for manufacturing and handling. The inner and outer shafts 12 and 16 can then be telescoped, at which time the outer shaft will force the ball further into its associated bore thereby taking up the exact clearance of each assembly. This will eliminate the tolerance stack of the inner shaft 12, the bore 14 of the outer shaft 16, and the drill depth of the blind bores 22. The spring back of the steel, or other suitable material, which tends to force the balls 20 back out of their associated bores 22, acts as "stored energy" and can be considered in this application as a high rate spring. This force is developed by properly designing the interference fit between the balls and their respective bores. The force required to collapse the coupling is then only a function of the diameter of the blind bores 22.

If the desired collapsing force is to be held to a predetermined value, e.g., 200–400 pounds, the maximum torsional twist in both directions of shaft rotation, e.g., 110 ft.-lbs., may force the ball 20 deeper into their bores 22 and thereby render them ineffective for eliminating torsional lash. In order to avoid this problem, the inner hexagonal shaft 12 is formed with a reduced section 30 which acts as a torsion bar. In other words, section 30 is a rotationally flexible section. With this construction it will be seen that the force transmitting balls 20 are located at one end 12A of the torsion bar and a full size hex, which acts as a failsafe, is located at the other end 12B of the torsion bar. Referring to FIGURES 2, 3 and 3A it will be seen that during counterclockwise rotation of shafts 12 and 16 torsional loads are transmitted from shaft 12 to shaft 16 by direct contact of the hexagonal shaft 12, at both ends 12A and 12B thereof, with hexagonal bore 14 of the shaft 16, as shown in FIGURES 2 and 3. During clockwise rotation of shafts 12 and 16, all torsional loads below a predetermined value are transmitted from shaft 12 to shaft 16 through force transmitting balls 20. All clockwise torsional loads above this predetermined value will cause the torsion bar section 30 to twist until the failsafe end 12B of the shaft abuts the bore 14 of shaft 16, as shown in FIGURE 3A, at which time all torsional loads in excess of the predetermined value are transmitted directly from shaft 12 to shaft 16. Thus, clockwise rotation of shaft 12 will only load the balls to a predetermined load in the direction against the ball preload and the torsional deflection designed into the torsion bar section will allow the opposite sides of the hex shaft of the failsafe to carry the heavy torsional loads.

Instead of drilling two blind bores 22, as shown in FIGURE 2 for receiving the balls 20, a single through bore 32 can be drilled for receiving the balls 22, as shown in FIGURE 4. Such an arrangement, which is somewhat less expensive to fabricate, is functionally the same as the previous arrangement. It will be noted, however, that, in order to achieve the desired couple and relative rotation between the shafts 12 and 16, the center of the through bore 32 is offset 1°–2° from the opposed corners of the hex shaft 12. One of the structural advantages of this type of arrangement is that all torsional loads F which act on the balls 20 do not act substantially along the axis of through bore 32, but act instead at a substantial angle thereto so that the opposite wall 34 of the bore 32 acts as a seat which tends to prevent the forcing of ball 22 deeper into the bore.

Figure 6:
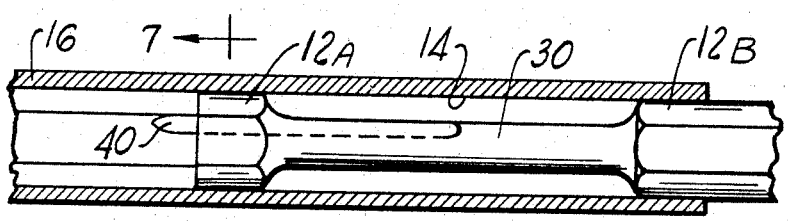
FIGURE 6 is a sectional view, similar to FIGURE 1, showing another embodiment of the invention.

FIGURES 6 and 7 show another embodiment of the invention which is the same as the embodiment shown in FIGURES 1–3, except that the force transmitting abutment means protrude from the outer shaft 16 instead of the inner shaft 12. In other words the outwardly protruding inner shaft balls 20 of FIGURES 1–3, are replaced by inwardly deformed outer shaft portions 40. These inwardly deformed portions or dimples 40 are formed in the outer shaft 16 prior to being telescoped over the inner shaft 12 by any suitable deforming operation, such as by coining. Torsional loads above a predetermined value are prevented from forcing the dimples 40 outwardly and rendering them ineffective in the same manner as in the FIGURE 1 embodiment, namely by the torsional deflection of torsion bar 30 which permits the failsafe portion 12B of the inner shaft to carry the torsional loads above said predetermined value.

Figure 9:
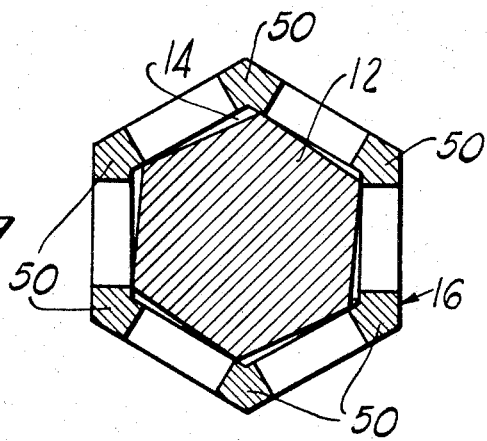
FIGURE 9 is an exaggerated sectional view taken along 9—9 of FIGURE 8.
Figure 8:
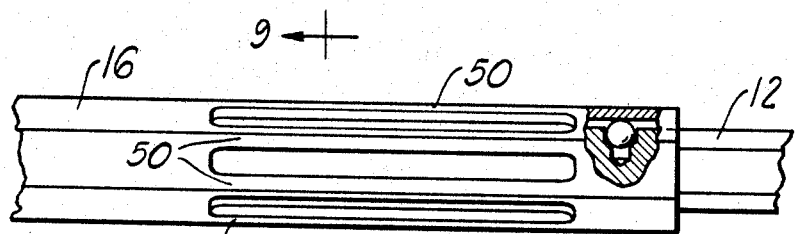
FIGURE 8 is a sectional view, similar to FIGURES 1 and 6, showing a further embodiment of the invention.

FIGURES 8 and 9 show another embodiment of the invention wherein a plurality of circumferentially disposed axially extending flexible struts 50 formed on the outer shaft 16 are substituted for the torsion bar 30 of the inner shaft 12 in the previous embodiments. In other words the rotationally flexible section 30 which is located between the ends of the inner shaft 12 in the embodiments of FIGURES 1 and 6, is replaced by a rotationally flexible section 50 which is located between the ends of the outer shaft 16. Although the balls 20 are shown as the force transmitting abutments for eliminating lash, it will be understood that, if desired, dimples 40, as shown in FIGURES 6 and 7, or other suitable means, can be substituted in place thereof.

It will be noted that, in all of the foregoing embodiments, the force transmitting abutment means, e.g., ball 20 or dimples 40, are located between the rotationally flexible section, e.g., torsion bar 30 or flexible strut cage 50, and the telescoping end of the shaft on which the rotationally flexible section is formed. It necessarily follows that the failsafe means is located at the other end of the rotationally flexible section.

Figure 10:
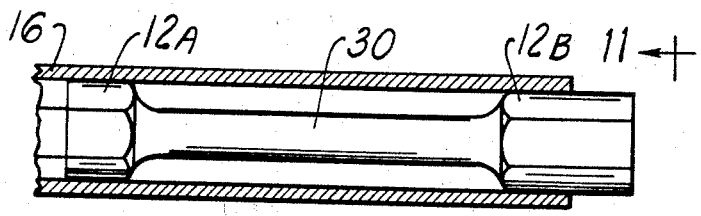
FIGURE 10 is a sectional view of two telescoping shafts showing a still further embodiment of the invention.
Figure 11:
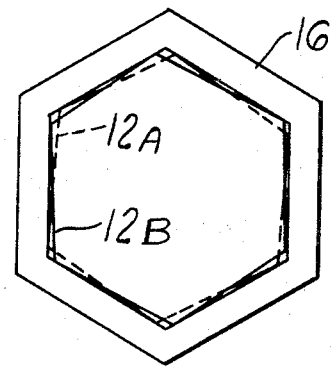
FIGURE 11 is an exaggerated end view taken along line 11—11 of FIGURE 10.

In the embodiment of FIGURES 10 and 11, neither balls 20 nor dimples 40 are utilized to cause relative rotation and frictional engagement between the inner and outer shafts 12 and 16 to eliminate torsional lash therebetween. In this embodiment the torsion bar section 30 is torsionally preloaded so that one end 12A is rotated in one direction relative to the outer shaft 16 and the other end 12B is rotated in an opposite direction relative to the outer shaft. Thus, referring to FIGURE 11, it will be seen that during counterclockwise rotation of shafts 12 and 16 torsional loads are transmitted from shaft 12 to shaft 16 by direct contact of portion 12B of the inner shaft with the hexagonal bore 14 of shaft 16. During clockwise rotation of shafts 12 and 16 all torsional loads below a predetermined value are transmitted from shaft 12 to shaft 16 via the portion 12A of the inner shaft. All clockwise torsional loads above this predetermined value will cause the torsion bar section 20 to twist further until the failsafe end 12B of the inner shaft abuts the bore 14 of shaft 16, in a manner similar to that which is shown in FIGURE 3A, at which time torque is transmitted from the failsafe end. The torsion section 30 can be placed under the desired preload by any suitable means. For example, the inner shaft 12 could be heated and twisted to take a permanent set which will result in hexagonal end 12A being out of phase with hexagonal end 12B. With such an arrangement, end 12A of the inner shaft could be easily inserted into bore 14 of shaft 16. End 12B could then only be inserted into the bore by torsionally twisting reduced section 30 until end 12B is in phase with end 12A and the bore 14. Thus, upon insertion of both ends 12A and 12B within the bore, the torsion bar section will be under the desired preload. Another method of accomplishing the same result would be to leave both ends 12A and 12B of the inner shaft in phase and instead twist or fabricate the outer shaft 16 in such a manner that the hex bore portions which mate with ends 12A and 12B would be out of phase. With such an arrangement, insertion of inner shaft 12 within outer shaft 14, could only be accomplished by torsionally twisting the reduced section 30 thereof and placing same under the desired preload.

Figure 12:
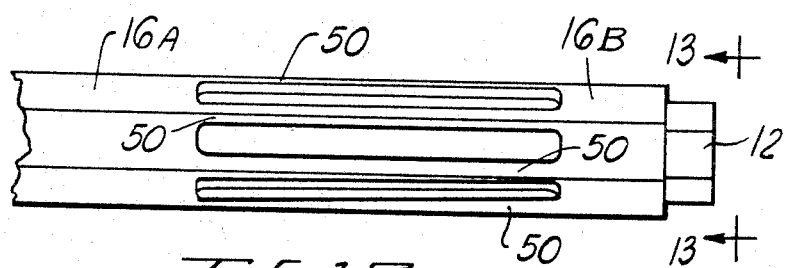
FIGURE 12 is a sectional view similar to FIGURE 10 showing a final embodiment of the invention.
Figure 13:
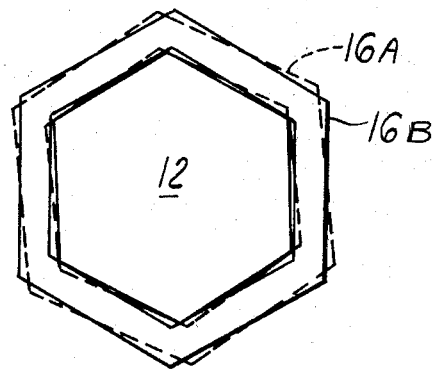
FIGURE 13 is an exaggerated end view taken along line 13—13 of FIGURE 12.

FIGURES 12 and 13 show a variation of the embodiment shown in FIGURES 10 and 11 wherein the rotationally flexible section 50 is located between the ends of the outer shaft 16 and is preloaded so that on end thereof 16A is rotated in one direction relative to the inner shaft 12 and the other end thereof 16B is rotated in an opposite direction relative to the inner shaft. The flexible section 50 would be formed of a plurality of circumferentially disposed axially extending flexible struts which are similar to those shown in FIGURE 8. Operation of this embodiment is functionally the same as the preloaded torsion bar embodiment of FIGURE 10. The struts 50 can be placed under the desired preload by any suitable means. For example, the outer tube 16 could be heated and twisted to take a permanent set which will result in the hexagonal bores at 16A and 16B being out of phase. With such an arrangement insertion of a symmetrical hex bar inner shaft could only be accomplished by twisting the outer shaft so that the struts 50 tend to straighten up and are placed under the desired preload. Alternatively, portions of the inner hex shaft could be formed out of phase to place the struts 52 under preload upon insertion of the inner shaft within the outer shaft.

The several practical advantages which flow from this type of an adjustable and/or collapsible steering column arrangement are believed to be obvious from the above, and other advantages may suggest themselves to those who are familiar with the art to which this invention relates.

Furthermore, although this invention has been described in connection with certain specific embodiments, it will be obvious to those skilled in the art that various changes may be made in the form, structure and arrangement of parts without departing from the spirit of the invention. For example, shafts having shapes and corresponding bores other than hexagonal would be suitable in the practice of this invention.

Having thus described the various features of the invention what I claim as new and desire to secure by Letters Patent is:

1. An axially movable steering column comprising inner and outer shafts, one of which is axially movable with respect to the other of said shafts, said inner shaft having a polygonal shape and said outer shaft having a corresponding polygonal bore therein for receiving said inner shaft, a rotationally flexible section located between the ends of one of said shafts, said inner and outer shafts comprising force transmitting means at one end of said rotationally flexible section for causing relative rotation and frictional engagement between said shafts to thereby eliminate torsional lash therebetween, said inner and said outer shaft cooperating at the other end of said rotationally flexible section in a fail-safe manner for limiting the forces exerted against said force transmitting means, with the cooperative relationship being rendered operative only at torque levels above a predetermined value which cause flexure of said rotationally flexible section and relative rotation between said shafts at said other end in a reverse direction from that which provided initial frictional engagement until said shafts are again in frictional engagement.

2. An axially movable steering column, as defined in claim 1, wherein said rotationally flexible section is located between the ends of said inner shaft.

3. An axially movable steering column, as defined in claim 2, wherein said force transmitting means is located between said rotationally flexible section and the telescoping end of said inner shaft.

4. An axially movable steering column, as defined in claim 3, wherein said rotationally flexible section includes a reduced section acting as a torsion bar.

5. An axially movable steering column, as defined in claim 4, wherein said force transmitting means includes abutment means protruding from a polygonal surface of one of said shafts into abutment with a polygonal surface of the other of said shafts at a location off center of the abutting polygonal surface.

6. An axially movable steering column, as defined in claim 5, wherein said abutment means protrude from said inner shaft.

7. An axially movable steering column, as defined in claim 6, wherein said inner shaft includes at least one bore therein and said abutment means includes a spherical member press fit into and protruding from said bore.

8. An axially movable steering column, as defined in claim 7, wherein said bore extends radially through said shaft and said abutment means includes a spherical member press fit into and protruding from each end of the bore.

9. An axially movable steering column, as defined in claim 5, wherein said abutment means protrude from said outer shaft.

10. An axially movable steering column, as defined in claim 9, wherein said abutment means is an inwardly deformed portion of a polygonal surface of said outer shaft.

11. An axially movable steering column, as defined in claim 1, wherein said rotationally flexible section is located between the ends of said outer shaft.

12. An axially movable steering column, as defined in claim 11, wherein said force transmitting means is located between said rotationally flexible section and the telescoping end of said outer shaft.

13. An axially movable steering column, as defined in claim 12, wherein said rotationally flexible section includes a plurality of circumferentially disposed axially extending flexible struts.

14. An axially movable steering column, as defined in claim 13, wherein said force transmitting means includes abutment means protruding from a polygonal surface of one of said shafts into abutment with a polygonal surface of the other of said shafts at a location off center of the abutting polygonal surface.

15. An axially movable steering column, as defined in claim 14, wherein said abutment means protrude from said inner shaft.

16. An axially movable steering column, as defined in claim 15, wherein said inner shaft includes at least one bore therein and said abutment means includes a spherical member having a press fit into and protruding from said bore.

17. An axially movable steering column, as defined in claim 5, wherein said abutment means protrude from said outer shaft.

18. An axially movable steering column, as defined in claim 9, wherein said abutment means is an inwardly deformed portion of a polygonal surface of said outer shaft.

19. An axially movable steering column, as defined in claim 2, wherein said rotationally flexible section of said inner shaft is torsionally preloaded so that said one end thereof is rotated in one direction relative to said outer shaft and said other end thereof is rotated in an opposite direction relative to said outer shaft.

20. An axially movable steering column, as defined in claim 19, wherein said rotationally flexible section includes a reduced section acting as a torsion bar.

21. An axially movable steering column, as defined in claim 11, wherein said rotationally flexible section of said outer shaft is preloaded so that said one end thereof is rotated in one direction relative to said inner shaft and said other end thereof is rotated in an opposite direction relative to said inner shaft.

22. An axially movable steering column, as defined in claim 21, wherein said rotationally flexible section includes a plurality of circumferentially disposed axially extending flexible struts.

23. An axially movable steering column comprising inner and outer shafts, one of which is axially movable with respect to the other of said shafts, said inner shaft having a shape which includes at least one corner and said outer shaft having a bore of corresponding shape for receiving said inner shaft, a rotationally flexible section located between the ends of one of said shafts, said inner and outer shafts comprising force transmitting means at one end of said rotationally flexible section for causing relative rotation and frictional engagement between said shafts to thereby eliminate torsional lash therebetween, said inner and said outer shaft cooperating at the other end of said rotationally flexible section in a fail-safe manner for limiting the forces exerted against said force transmitting means, with the cooperative relationship being rendered operative only at torque levels above a predetermined value which cause flexure of said rotationally flexible section and relative rotation between said shafts at said other end location in a reverse direction from that which provided initial frictional engagement until said shafts are again in frictional engagement.

References Cited

UNITED STATES PATENTS 912,215  2/1909  Warren _____ 74—493 X

MILTON KAUFMAN, *Primary Examiner.*

U.S. Cl. X.R.

287—52.09, 58